3,679,466
REPELLING OF MARINE ANIMAL PESTS
Mark M. Bowman, Jr., Bartlesville, Okla., assignor to Phillips Petroleum Company
No Drawing. Filed Mar. 6, 1970, Ser. No. 17,305
Int. Cl. A01n 9/12; B44d 1/26, 1/34
U.S. Cl. 117—127       10 Claims

ABSTRACT OF THE DISCLOSURE
Methods of repelling marine animal pests from structures comprising wood and/or metal using an N,N-dimethylsulfenyl dithiocarbamate.

---

This invention relates to repelling of marine animal pests. In one aspect this invention relates to methods for using an N,N-dimethylsulfenyl dithiocarbamate to repel marine animal pests from structures comprising wood and/or metal.

The problem of fouling and/or attack on wood and/or metal structures such as boats, ships, buoys, piling, etc., by marine animal pests such as barnacles, borers, and other molluks is well known. The problem is particularly severe in tropical areas where the activity of said pests is favored by the warm water temperatures. The *Teredo navalis*, commonly known as teredo worms or ship worms, are particularly severe in their attack on wooden structures. In some areas they can cause total loss of wooden boats, ships, piling, etc., unless the structure is protected in some manner. It is common practice in such areas to plate said structures using copper and other metals. Thus, any material which has a repellent action toward said marine animal pests would be highly useful and advantageous when applied to structures which are subject to attack by said pests.

I have now discovered that N,N-dimethylsulfenyl dithiocarbamates are effective repellents for marine borers such as *Teredo navalis*, barnacles, and other fouling genera commonly present in sea water and other marine waters such as estuaries, lakes, and rivers. Said N,N-dimethylsulfenyl dithiocarbamates are known to be effective repellents for insects and rodents. For example, see U.S. Pats. 2,621,143 and 2,862,850. However, it was surprising and unexpected that said compounds would be repellent for marine animal pests in a marine environment because said pests comprise a completely different class and have sensory apparatus which is different from that of either insects or rodents.

Thus, an object of this invention is to provide a method for repelling marine animal pests. Another object of this invention is to provide a method for repelling marine animal pests using an N,N-dimethylsulfenyl dithiocarbamate. Other aspects, objects, and advantages of the invention will be apparent to those skilled in the art from this disclosure.

Thus, according to the invention, there is provided a method for repelling marine animal pests from a structure which is at least partially submerged in marine water for at least a portion of the time, which method comprises applying to said structure an N,N-dimethylsulfenyl dithiocarbamate in an amount sufficient to effectively repel said pests.

The compounds used in the practice of the invention can be prepared by any convenient method. One method for the preparation of said compounds comprises reacting an alkali metal salt of an N-substituted dithiocarbamate with an aliphatic sulfenyl thiocyanate. Further details regarding this method of preparing said compounds can be found in U.S. Pat. 2,390,713. Another method for the preparation of the compounds of the invention comprises reacting a lower alkyl sulfenyl halide with salts of N-substituted dithiocarbamic acid in aqueous solution as disclosed and claimed in U.S. Pat. 2,792,394, issued May 14, 1957. The latter method of preparation is a presently preferred method.

Specific compounds applicable to the present invention include N,N-dimethyl-S-methylsulfenyl dithiocarbamate and N,N-dimethyl-S-tert-butylsulfenyl dithiocarbamate.

The repellent agents of the invention can be applied by various means to a structure to be protected. Preferably said repellents are incorporated with a solvent or other similar inert repellent adjuvant material and applied to the structure to be protected. Said repellent can be dissolved or dispersed in any suitable carrier and applied by spraying, brushing, or other known means. When the structure to be protected is made principally of wood, vacuum or pressure impregnation are presently preferred methods for applying the repellents to the structure.

Examples of suitable solvents or carriers include, among others, the following: aromatic hydrocarbons such as benzene, toluene, and xylene; aromatic hydrocarbon oil concentrates; organic polar solvents; diesel fuel; petroleum naphthas; gum rosin; and halogenated hydrocarbons. Marine paints, varnishes, and paint vehicles such as linseed oil can also be used as carriers in the practice of the invention. The repellents of the invention can be incorporated in amounts up to at least 5 weight percent into polyurethane and varnish-type coatings vehicles without affecting the drying times or hardness of the films. The choice of any particular solvent or carrier will depend upon the structure to be protected, the use to be made of said structure, conditions of use of the structure, method of application to the structure, temperature, etc. The repellents of the invention can be dissolved or dispersed in said solvents or carriers in any suitable amount. Preferably, said repellents are usually dissolved or dispersed in the solvent or carrier in an amount of about 1 to about 2 pounds per gallon so as to form a concentrate which can then be diluted to a desired or convenient concentration suitable for the particular structure to be protected and the method of application to be used in applying the repellent to said structure. Water can be used advantageously to form emulsions of said repellents and a solvent carrier for spraying. When preparing aqueous emulsions, wetting or emulsifying agents such as Triton X–100 (alkylaryl polyether alcohol), Dresinate 731 (sodium salt of a disproportionated rosin acid), Tween 20 (sorbitan monolaurate polyethylene oxide), and the like, can be employed in sufficient amount to stabilize the emulsion.

Said repellents are applied to the surface of the structure to be protected in a small but effective amount sufficient to repel said marine animal pests. As a guide to those skilled in the art, but not necessarily limiting on the practice of the invention, said repellents will usually be applied in an amount of at least 75, preferably about 75 to about 200, more preferably about 100 to about 175, milligrams per square foot of surface to be protected. Said amounts can be applied in one treatment or a plurality of treatments.

The following Table I and Table II set forth solubility data for specific examples of solvents which can be used in the practice of the invention.

TABLE I

|  | Weight percent solubility at— | |
| --- | --- | --- |
|  | 77° F. | 38° F. |
| Tetrahydrofuran | 56.5 | 40.1 |
| Benzene | 54.5 |  |
| Methyl ethyl ketone | 48.7 | 27.5 |
| Acetone | 48.4 | 24.3 |
| Dimethylformamide | 47.1 | 27.0 |
| Toluene | 46.5 |  |
| Dimethylacetamide | 46.0 | 27.5 |
| Trichloroethylene | 40.7 | 27.4 |
| Xylene | 38.5 | 20.3 |
| Methyl isobutyl ketone | 38.3 | 19.7 |
| Ethyl acetate | 34.2 | 17.3 |
| n-Butyl acetate | 30.1 | 14.5 |
| Cellosolve acetate | 28.6 | 13.1 |
| Dimethyl sulfoxide | 24.4 |  |
| 4-hydroxy-4-methyl-2-pentanone | 22.7 | 11.1 |
| Sulfolane | 19.8 |  |
| Diisooctylphthalate (DIOP) | 18.7 |  |
| Dioctylphthalate (DOP) | 17.4 |  |
| Dioctyladipate (DOA) | 13.8 |  |
| Methanol | 11.3 | 4.2 |
| Turpentine | 10.7 |  |
| Refined linseed oil | 9.1 |  |
| Cyclohexane | 8.8 |  |
| Diesel fuel | 8.3 |  |
| Isopropyl alcohol | 7.7 | 1.3 |
| Kerosene | 6.5 |  |
| Dilution grade naphtha | 6.5 |  |
| Precipitation grade naphtha | 5.7 |  |
| n-Heptane | 3.1 | 0.4 |

TABLE II

| Solvent | Solubility, wt. percent | | Boiling range, ° F. | Flash point ° F. |
| --- | --- | --- | --- | --- |
|  | 77° F. | 20° F. |  |  |
| Avon 400 w [a] | 34 | 13 | 440–700 | 230 |
| Mobilsol 44 [b] | 27 | 12 | 567–683 | 315 |
| Avon secondary plasticizer [c] | <20 | <10 |  |  |
| Panaflex [d] | 20 | 10–15 |  |  |
| HB-40 [e] | <20 | 5–10 |  |  |
| Unit 30 ext. oil [f] | 20–25 | <5 |  |  |

[a] By-product oil from Avon Refinery. Estimated to be 90–100 percent, aromatic. Comprised of 53 percent naphtalene, α-methyl naphthalene and α-methyl naphthalene with the remainder consisting of unidentified components boiling in the α-naphthalene range or above.
[b] Aromatic solvent from Mobil Oil Co. Reported to be alkylated phenanthrene.
[c] Derived from SO₂ extract of light gas oil.
[d] Amoco secondary plasticizer. Believed to be alkylated methylnaphthalene.
[e] Monsanto secondary plasticizer. Believed to be a terphenyl-quaterphenyl mixture.
[f] Aromatic extract oil from solvent extraction catalytic cracked gas oils.

The following examples will serve to further illustrate the invention.

EXAMPLE I

Four pine wood panels approximately 6 inches wide, 12 inches long, and 1 inch thick were treated with N,N-dimethyl-S-tert-butylsulfenyl dithiocarbamate in accordance with the invention. A 20 weight percent solution of said dithiocarbamate in xylene and a 5.6 weight percent solution of said dithiocarbamate in diesel fuel were prepared. Two of said panels were impregnated with said xylene solution and two of said panels were impregnated with said diesel fuel solution in the following manner. The panels were placed in trays and immersed in said solutions. The trays were placed in a vacuum chamber which was then evacuated. Evacuation of the chamber was continued until air bubbles ceased emerging from the wood. The vacuum attained was approximately 28 inches. Air was then allowed to slowly fill the chamber and restore atmospheric pressure. This procedure forced the treating solution into the pores of the wood previously occupied by the air.

An untreated control pine wood panel, one of said panels treated with said xylene solution, and one of said panels treated with said diesel fuel solution were mounted on a rack comprising two lengths of steel pipe by lashing the panels to the pipe with polyethylene rope. A second similar rack was also prepared. One of said racks was installed at the bottom of the bay, i.e., the mud line, at a marine terminal at Jacksonville, Fla. The other of said racks was installed at approximately the high tide level at said marine terminal. Said mud line rack was thus completely submerged during the period of test and said high tide rack was submerged for a period of 2 to 3 hours at each high tide. At the end of a one-year test period the racks were removed from the water and the panels inspected. The untreated pine panels from both racks showed severe marine borer attack. The panels (from both racks) which were treated with said dithiocarbamate repellent showed no visible attack by marine borers. The two untreated panels were encrusted with barnacles. The two panels treated with the xylene solution of said dithiocarbamate and the two panels treated with the diesel fuel solution of said dithiocarbamate showed a small amount of barnacle attachment, much less than the amount of said untreated control panels.

The results of the above tests show that said dithiocarbamate repellent of the invention is an effective repellent for marine borers, barnacles, and other marine animal pests. Said tests show that said dithiocarbamate repellent is particularly effective against the dreaded marine borers.

EXAMPLE II

In another test, N,N-dimethyl-S-tert-butylsulfenyl dithiocarbamate was incorporated in a commercial marine paint in an amount of approximately 2 percent by weight. Carbon steel panels were then painted with said marine paint containing the dithiocarbamate repellent. The painted panels were then exposed to water in the Houston ship channel for a test period of approximately 6 months. Upon inspection at the end of said test period, it was found that said painted panels were essentially free of barnacle infestation.

The above tests show that the repellents of the invention are effective against barnacle attachment or encrustation.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for repelling marine animal pests, present in marine water, from a structure while said structure is at least partially submerged in said marine water, which method comprises applying to said structure an N,N-dimethylsulfenyl dithiocarbamate in an amount sufficient to effectively repel said pests, and at least partially submerging said treated structure in marine water.

2. A method according to claim 1 wherein said dithiocarbamate is incorporatel with a carrier therefor.

3. A method according to claim 2 wherein said dithiocarbamate is selected from the group consisting of N,N-dimethyl-S-tetrt-butylsulfenyl dithiocarbamate, N,N-dimethyl-S-methylsulfenyl dithiocarbamate, and mixtures thereof.

4. A method according to claim 3 wherein said dithiocarbamate is N,N-dimethyl-S-tetrt-butylsulfenyl dithiocarbamate.

5. A method according to claim 3 wherein said dithiocarbamate is N,N-dimethyl-S-methylsulfenyl dithiocarbamate.

6. A method according to claim 1 wherein: said structure comprises metal, wood, or metal and wood; said dithiocarbamate is incorporated with a carrier therefor;

and said dithiocarbamate is selected from the group consisting of N,N-dimethyl-S-tert-butylsulfenyl dithiocarbamate, N,N-dimethyl-S-methylsulfenyl dithiocarbamate, and mixtures thereof.

7. A method according to claim 6 wherein: said structure is comprised principally of wood; said dithiocarbamate is N,N-dimethyl-S-tert-butylsulfenyl dithiocarbamate; and said carrier is selected from the group consisting of benzene, toluene, xylene, aromatic hydrocarbon oil concentrates, organic polar solvents, diesel fuel, petroleum naphthas, gum rosin, and halogenated hydrocarbons.

8. A method according to claim 7 wherein said carrier is xylene and said wood is impregnated with said dithiocarbamate in an amount of at least 75 milligrams per square foot of surface to be protected.

9. A method according to claim 7 wherein said carrier is diesel fuel and said wood is impregnated with said dithiocarbamate in an amount of at least 75 milligrams per square foot of surface to be protected.

10. A method according to claim 1 wherein said pests are marine borers or barnacles.

References Cited

UNITED STATES PATENTS

| 2,621,143 | 12/1952 | Goodhue et al. | 424—29 |
| 2,862,850 | 12/1958 | Goodhue | 424—300 |
| 3,434,995 | 3/1969 | Shotton | 424—300 |
| 3,448,586 | 6/1969 | Mailen et al. | 424—300 |
| 3,081,175 | 3/1963 | Waite et al. | 106—15 AF |
| 3,259,643 | 7/1966 | Nash | 117—147 |
| 3,265,567 | 8/1966 | Rice et al. | 117—147 |

FOREIGN PATENTS

| 39/9681 | 5/1964 | Japan | 106—15 AF |
| 39/9682 | 5/1964 | Japan | 106—15 AF |
| 39/21104 | 26/1964 | Japan | 106—15 AF |

WILLIAM D. MARTIN, Primary Examiner

S. L. CHILDS, Assistant Examiner

U.S. Cl. X.R.

106—15 AF; 117—147; 424—29, 300

UNITED STATES PATENT OFFICE

CERTIFICATE OF CORRECTION

Patent No. 3,679,466                  Dated: July 25, 1972

Mark M. Bowman, Jr.

It is certified that error appears in the above-identified patent and that said Letters Patent are hereby corrected as shown below:

column 4, line 64, the word "tetrt" should read — tert —; column 4, line 68, the word "tetrt" should read — tert —; and column 5, line 20, after "said" insert — marine —.

Signed and sealed this 6th day of March 1973.

(SEAL)
Attest:

EDWARD M. FLETCHER, JR.                  ROBERT GOTTSCHALK
Attesting Officer                              Commissioner of Patents

UNITED STATES PATENT OFFICE

CERTIFICATE OF CORRECTION

Patent No. 3,679,466                            Dated: July 25, 1972

Mark M. Bowman, Jr.

It is certified that error appears in the above-identified patent and that said Letters Patent are hereby corrected as shown below:

Column 3, line 8, after "for" insert --- N,N-dimethyl-S-tert-butylsulfenyl dithiocarbamate in ---.

Signed and sealed this 29th day of May 1973.

(SEAL)
Attest:

EDWARD M. FLETCHER, JR.                        ROBERT GOTTSCHALK
Attesting Officer                                  Commissioner of Patents